United States Patent [19]

Rylatt

[11] Patent Number: 4,668,466
[45] Date of Patent: May 26, 1987

[54] GRID CELL SPRING FORCE MEASUREMENT APPARATUS AND METHOD

[75] Inventor: John A. Rylatt, Monroeville Boro, Pa.

[73] Assignee: Westinghouse Electric Corp., Pittsburgh, Pa.

[21] Appl. No.: 703,166

[22] Filed: Feb. 19, 1985

[51] Int. Cl.<sup>4</sup> .............................................. G21C 17/00
[52] U.S. Cl. ........................................ 376/245; 73/161
[58] Field of Search ............................ 73/161; 376/245

[56] References Cited

U.S. PATENT DOCUMENTS

| 4,246,783 | 1/1981 | Steven et al. | 73/161 |
| 4,559,820 | 12/1985 | Zava et al. | 73/161 |

FOREIGN PATENT DOCUMENTS

| 2010892 | 9/1970 | Fed. Rep. of Germany | 376/245 |
| 48-821571 | 6/1973 | Japan | 376/245 |

Primary Examiner—Salvatore Cangialosi

[57] ABSTRACT

A grid cell spring force measuring apparatus includes a pair of elongated bars being pivotally connected together at their respective mid-sections and having a set screw for presetting the displacement between the lower end portions of the bars and a rotatable shaft with a knob for applying a separation force to the upper end portions of the bars. When the displacement of the bars and thereby their cross sectional dimension is preset and the bars have been inserted into a grid cell, the shaft is rotated using the knob and the upper end portions of the bars are gradually forced apart. Once the force being applied at the upper end portions and transmitted to the lower end portions of the bars overcomes the spring force, the spring deflects and the bars separate enough to open electrical contacts mounted on the bars. At the instance the contacts are opened, a readout connected to a strain gauge fixed on one of the bars records the level of force being imposed by the bar on the cell spring.

20 Claims, 7 Drawing Figures

GRID CELL SPRING FORCE MEASUREMENT APPARATUS AND METHOD

BACKGROUND OF THE INVENTION

1. Field of the Invention

The present invention relates generally to fuel assemblies for nuclear reactors and, more particularly, is concerned with an apparatus and method for measuring the spring force imposed on a fuel rod when disposed through a cell in the support grid of the fuel assembly.

2. Description of the Prior Art

In most nuclear reactors, the reactor core is comprised of a large number of elongated fuel assemblies. Conventional designs of these fuel assemblies include a plurality of fuel rods held in an organized array by a plurality of grids spaced axially along the fuel assembly length and attached to a plurality of elongated control rod guide thimbles of the fuel assembly. Top and bottom nozzles on opposite ends of the fuel assembly are secured to the guide thimbles which extend slightly above the below the ends of the fuel rods.

The grids as well known in the art are used to precisely maintain the spacing between the fuel rods in the reactor core, prevent rod vibration, provide lateral support for the fuel rods, and, to some extent, frictionally retain the rods against longitudinal movement. Conventional designs of grids include a multiplicity of interleaved straps having an egg-crate configuration designed to form cells which individually accept the fuel rods and control rod guide thimbles. The cells of each grid which accept and support the fuel rods at a given axial location therealong typically use relatively resilient springs and relatively rigid protrusions (called dimples) formed into the metal of the interleaved straps. The springs and dimples of each grid cell frictionally engage or contact the respective fuel rod extending through the cell. Additionally, outer straps are attached together and peripherally enclose the grid straps to impart strength and rigidity to the grid.

In view that the opeation of the reactor core involves irradiation of the fuel rods, it is desirable that the supporting forces imposed by the grid on the fuel rods fall within such a range that the grid adequately supports the fuel rods but does not promote lengthwise distortion thereof over time. Also, in view that the grids are irradiated along with the fuel rods they support, the grids inherently degrade somewhat over time as a result. In particular, notwithstanding improvements in grid construction, such as illustrated and described in U.S. Pat. No. 4,474,730 issued Oct. 2, 1984 and assigned to the assignee of the present invention, over the life of the fuel assembly the metal of the interleaved straps forming the grid, and thereby the springs and dimples formed therein, are subject to stress relaxation due to irradiation.

In light of the above conditions, it is necessary to initially carry out grid spring force measurements during the manufacture of the grid. Then, although the strap material does not ordinarily suffer a significant loss of resiliency when exposed to intense and prolonged irradiation, it is also desirable to carry out periodic checks of the forces imposed by the springs on the fuel rods during the life of the grid in order to monitor and detect the degree of degradation of the grid in terms of its ability to continue to provide adequate fuel rod support.

One present technique for initially measuring grid forces during manufacture is to select a typical spring taken from a strip of formed strap material and characterize it by force/deflection curves. Other techniques include the use of a solid bar acting on a grid spring in a grid assembly to provide similar force/deflection curves which take into account some of the spring/cell boundary conditions. From the above techniques, grid spring forces for a given size fuel rod are interpolated from a set of curves based on statistically averaged values. However, with these techniques it is not possible to evaluate by direct means the interaction of the dimples and strap joints opposing the forces imposed by the grid spring, nor the flexibility of the grid strap as an individual cell wall of a total grid assembly containing numerous cells.

Another techniques for measuring grid spring forces is illustrated and described in U.S. Pat. No. 4,246,783 to Steven et al. The Steven et al measuring device uses a flexible beam on the force measuring plug having a diameter equal to the diameter of the fuel rod to be inserted into the spacer gird. A strain gage is disposed on the flexible beam and electrically picks up bending of the flexible beam as the device is inserted into the grid cell. However, it is necessary to have available different plugs with the proper dimensions for measuring different sizes of fuel rod diameters and different spacer geometries.

Consequently, a need exists for a technique to measure grid spring forces in a manner which more nearly replicates real-life conditions, that is to say, the actual forces experienced by fuel rods as they are supported within the cells of the grid by the springs and dimples and to be able to carry out such measurements with relative ease, speed and accuracy,

SUMMARY OF THE INVENTION

The present invention provides a grid cell spring force measurement apparatus and method designed to satisfy the aforementioned needs. The apparatus of the present invention includes a pair of hinged bars being adaptable to simulate fuel rods of different outside diameter sizes. The apparatus further utilizes a strain gauge attached to one of the bars to sense the force applied to the spring and electrical contacts on the bars which go from a "closed" to "open" condition at the instance the applied force becomes marginally greater than the spring reaction force causing the spring to deflect. Further, the apparatus electrically records the strain gauge reading at this instance and hence provides a determination of the spring force for the preselected fuel rod outside diameter. By repeating the procedure for different preset dimensions of the pair of bars of the apparatus, the spring rate of the spring/dimple cell system in the grid can be determined. In such manner, rapid readout of forces is obtained with minimum apparatus setup requirements and thus individual grid cells can be characterized with repeatability, speed and accuracy not previously attainable using prior techniques.

Accordingly, the present invention is directed to an apparatus and method for measuring the spring force imposed on a fuel rod when disposed through a cell in a support grid of the fuel assembly which contains at least one spring-like element, comprising the operative steps of: (a) generating an increasing force at a first location external of the grid cell; (b) transferring the increasing force from the first location and applying the increasing force at a second location displaced from the first location and internal of the grid cell to the spring-like element disposed in the cell; and (c) measuring the level of the increasing force at the instance the application of the force causes deflection of the spring-like element to occur.

More particularly, the spring force measurement apparatus, comprises (a) a pair of front and rear elongated members, each having a mid-section and upper and lower end portions extending in opposite directions from the mid-section, the members being pivotally connected together at their mid-sections such that as the upper end portions of the members being juxtaposed in spaced apart relation to one another are moved toward and away from each other the lower end portions of the members also being juxtaposed in spaced apart relation to one another are moved away from and toward each other; (b) means disposed on the lower end portion of at least one of the members and being operable to coact with the lower end portion of the other of the members to preset a minimum displacement between the members at the respective lower end portions thereof and thereby a minimum combined cross-sectional dimension of the members at their lower end portions such that when the lower end portions of the members are inserted into a grid cell they simulate a fuel rod disposed through the cell having a predetermined outside diameter; (c) means coupling the upper end portions of the members together and being operable to apply a progressively increasing force so as to draw the upper end portions toward one another and thereby, via the pivotal connection of the members, push the lower end portions apart from one another when deflection of the spring-like element positioned within the grid cell in engagement with at least one of the lower end portions of the members occurs; (d) means coupled to at least one of the members for sensing the level of the increasing force being applied to the spring-like element within the grid cell; (e) means coupled to at least one of the members for sensing when the deflection of the spring-like element occurs; and (f) means coupled to the force level sensing means and the spring deflection sensing means for indicating the level of force at the instance the deflection of the spring-like element occurs.

Still further, the measuring apparatus comprises an adjustable stop attached to one of the members for engaging the grid so as to provide correct positioning of the lower end portions of the members in the grid cell for application of the increasing force to the spring-like element in the cell. Also, the measuring apparatus includes guide means coupled between the upper end portions of the elongated members to assist in maintaining alignment of the members with one another as they are pivotally moved relative to one another. Finally, the measuring apparatus has limit means connected to the upper end portion of one of the elongated members and extending transversely toward the upper end portion of the other of the elongated members for engagement therewith upon relative pivotal movement of the elongated members toward one another, the limit means being adjustable for presetting the minimum displacement between the upper end portions of the elongated members and thereby defining a maximum force which can be applied at the lower end portions of the elongated members to the sprng-like element in the grid cell.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
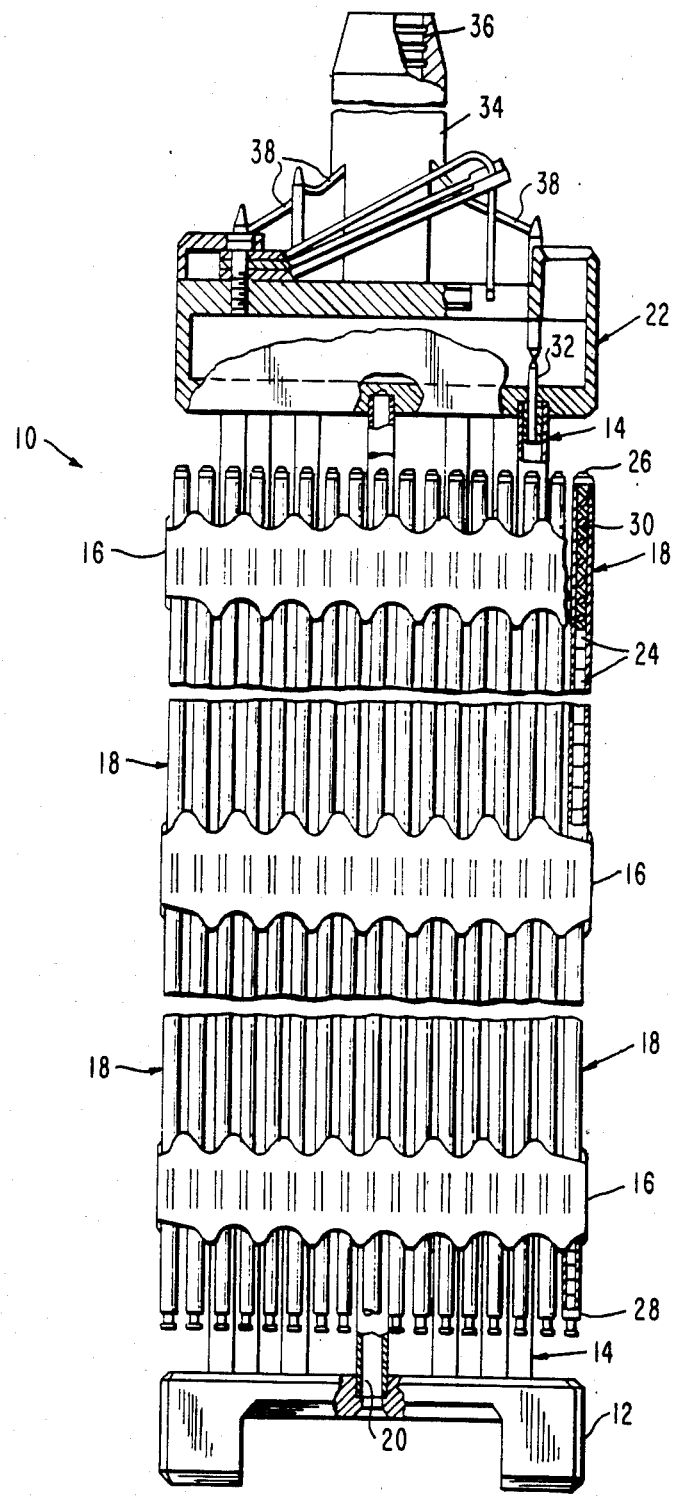
FIG. 1 is an elevational view, partly in section, of a nuclear fuel assembly having fuel rod support grids upon which the spring force measurement apparatus and method of the present invention can be employed.

In the following description, like reference characters designate like or corresponding parts throughout the several views. Also, in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 includes a rod cluster control mechanism 34 having an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel aassembly 10, all in a well-known manner.

Grid Cell Spring Force Measurement Apparatus

Figure 2:
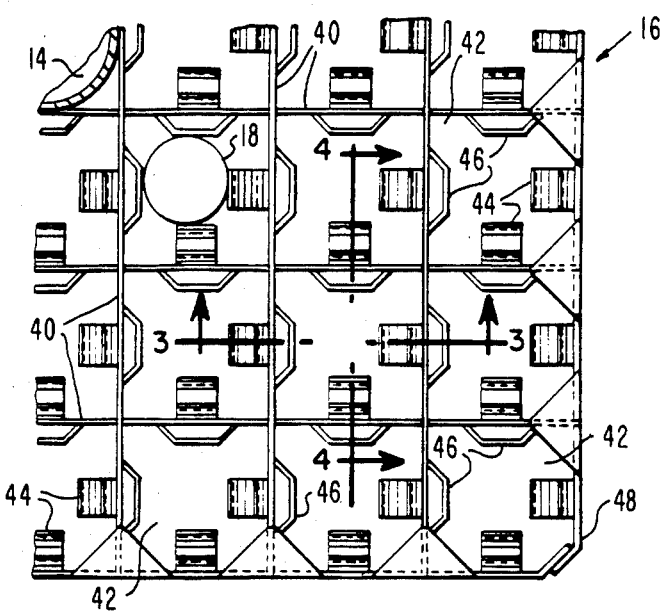
FIG. 2 is an enlarged fragmentary top plan view of one of the fuel rod support grids of the fuel assembly of FIG. 1, showing the springs and dimples disposed within the grid cells with one fuel rod being inserted through a cell.
Figure 3:
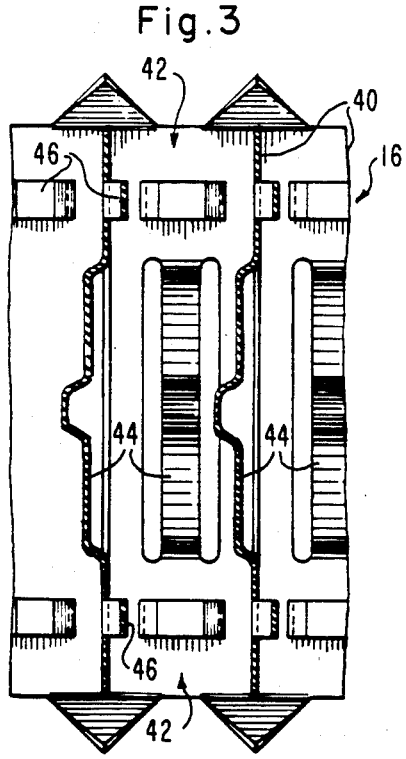
FIG. 3 is an enlarged fragmentary sectional view taken along line 3—3 of FIG. 2.
Figure 4:
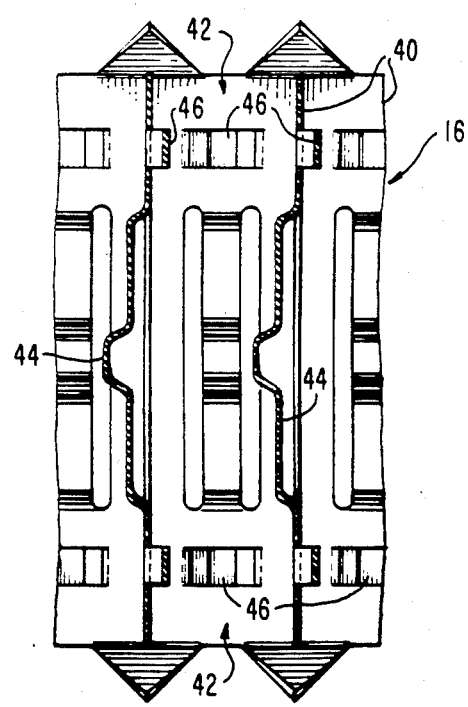
FIG. 4 is another enlarged fragmentary sectional view similar to that of FIG. 3, but taken along line 4—4 of FIG. 2 which is displaced ninety-degrees from line 3—3 of FIG. 2.

For precisely maintaining the spacing between the fuel rods 18 in the reactor core and preventing both lateral and longitudinal movement thereof, the grids 16 are conventionally designed to impose spring forces on the fuel rods 18 directed from around the circumference of the individual rod radially inwardly toward the longitudinal axis of the rod. Referring now to FIGS. 2 to 4, it is seen that each of the grids 16 includes a multiplicity of interleaved inner straps 40 having an egg-crate configuration designed to form cells, indicated as 42, a majority of which individual accept one fuel rod 18 (for purposes of clarity only one cell 40 is shown in FIG. 2 with a fuel rod 18 disposed through it) and a minority of which accept one control rod guide thimble 14.

The cells 42 of each grid 16 which accept and support the fuel rods 18 at a given axial location therealong typically use relatively resilient springs 44 and relatively rigid protrusions or dimples 46 formed into the metal of the interleaved inner straps 40 to generate the spring forces needed to hold the fuel rods therein. Also, the inner straps 40 are generally flexible such that they bow somewhat when the fuel rods 18 are disposed through the grid cells 42. In the illustrated embodiment, there are two springs 44 on two adjacent sides of each cell 42 containing a fuel rod 18 and two dimples 46 on each of two adjacent sides of the cell facing each spring. The springs 44 and dimples 46 of each grid cell 42 frictionally engage or contact the respective fuel rod 18 extending through the cell. Additionally, outer straps 48 are attached together and peripherally enclose the grid inner straps 40 to impart strength and rigidity to the grid 16. Thus, the actual spring force imposed on a given fuel rod 18 results from interaction with one another of the resilient springs 44, rigid dimples 46 and flexible interleaved straps 40 comprising the cell 42 which receives the fuel rod. In order to properly characterize the holding capability of an individual grid 16, it is this spring force that must be measured.

Figure 5:
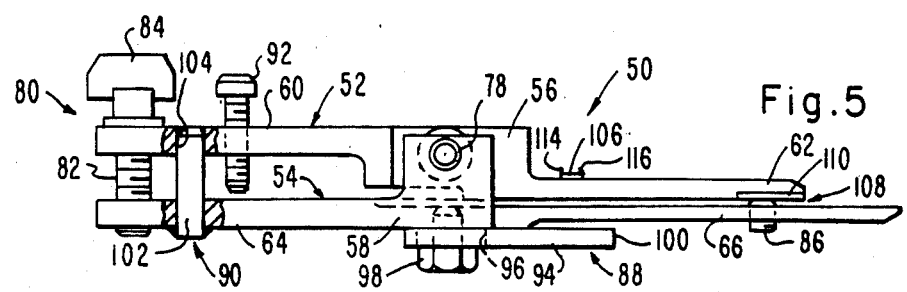
FIG. 5 is a side elevational view of the grid cell spring force measurement apparatus of the present invention.
Figure 6:
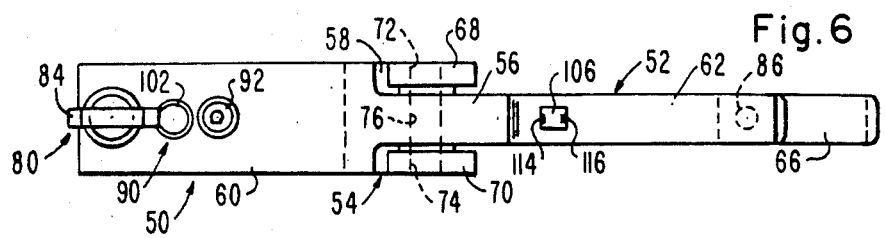
FIG. 6 is a top plan view of the spring force measurement apparatus of FIG. 5.
Figure 7:
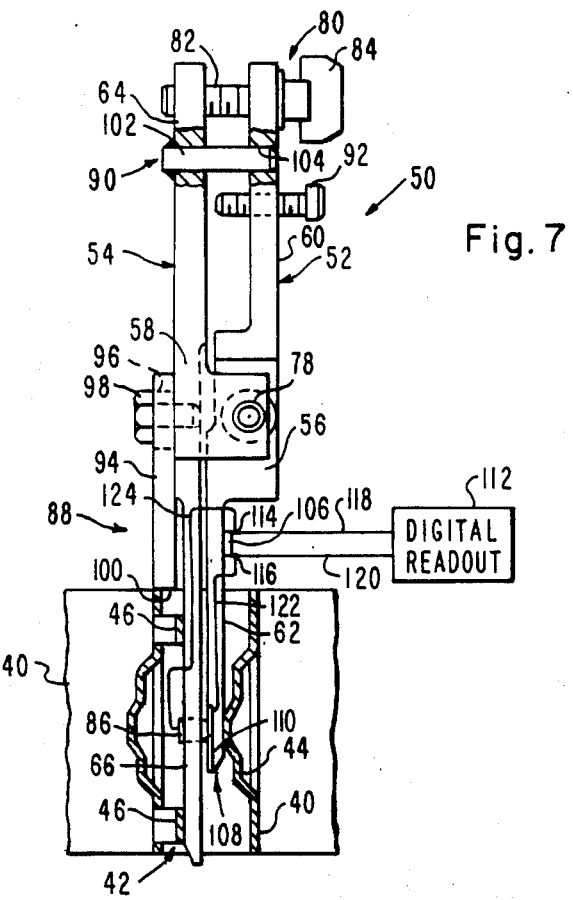
FIG. 7 is another side elevation view of the spring force measurement apparatus in which the apparatus is shown clockwise ninety-degrees from its position in FIG. 5 and inserted into one of the grid cells for taking a spring force measurement therein.

Turning finally to FIGS. 5 to 7, for measuring the spring force, resulting from the combined action of the system of resilient springs 44, rigid dimples 46 and flexible interleaved grid straps 40, imposed on a given fuel rod 18 when disposed through one cell 42 in one of the support grids 16 of the fuel assembly 19, the present invention provides a grid cell force measuring apparatus, generally designated 50. The measuring apparatus 50 includes a pair of front and rear elongated members 52,54 having respective mid-sections 56,58 and respective upper and lower end portions 60,62 and 64,66 extending in opposite directions from the respective midsections 56,58. The members 52,54 are pivotally connected together at their mid-sections 56,58 such that as the upper end portions 60,64 of the members, being juxtaposed in spaced apart relation to one another, are moved toward and away from each other the lower end portions 62,66 of the members, also being juxtaposed in spaced apart relation to one another, are moved away from and toward each other.

More particularly, the elongated members 52,54 of the measuring apparatus 50 take the form of a pair of front and rear bars. The upper and lower end portions 64,66 of the rear bar 54 extend in opposite directions from the mid-section 58 thereof and in generally linear alignment with one another, whereas the upper and lower end portions 60,62 of the front bar 52 extend in opposite directions from the mid-section 56 thereof but in a transversely offset relationship. Due to such offset relationship, the upper end portion 60 of the front bar 52 is spaced farther or remote from the upper end portion 64 of the rear bar 54 while the lower end portion 62 of the front bar 52 is spaced closer or adjacent to the lower end portion 66 of the rear bar 54. Additionally, a pair of transversely spaced tabs 68,70 are attached to the rear bar 54 at its mid-section 58 and extend generally parallel to one another and outwardly from a side thereof facing the front bar 52. The tabs 68,70 have respective aligned holes 72,74 defined therethrough, whereas a hole 76 is defined through the midsection 56 of the front bar 52. A pivot pin 78 extends through the aligned holes 72,74 in the spaced tabs 68,70 on the rear bar 54 and through the hole 76 in the front bar 52 so as to mount the front bar on the tabs for pivotal movement relative to the rear bar.

Further, the measuring apparatus 50 includes force generating means, generally designated 80, coupling the upper end portions 60,64 of the front and rear elongated bars 52,54 together and being operable to apply a progressively increasing force so as to draw the upper end portions toward one another and thereby, via the pivotal connection of the bars, push the lower end portions 62,66 apart from one another. In particular, the force generating means 80 includes a shaft 82 rotatably connected to one of the upper end portions 60,64 of the bars 52,54, such as the upper end portion 60 of the front bar 52, and threadably connected to the other thereof, such as the upper end portion 64 of the rear bar 54. A knob 84 is attached to an end of the shaft 82 disposed adjacent the front bar 52 for facilitating rotation of the shaft through manual turning of the knob in either of two opposite directions in order to move the upper end portions 60,64 of the elongated bars 52,54 toward and away from each other. Thus, the rotatable shaft 82 and knob 84 of the force generating means 80 are used to generate an increasing force at a first location along the elongated bars 52,54 which will be external of the given one grid cell 42 when the lower end portions 62,66 of the bars 52,54 are inserted in the cell to the position seen in FIG. 7 for carrying out the measuring procedure. The elongated bars then serve as means for transmitting that increasing force from the first location therealong and applying the force at a second location displaced from the first location and internal of the one grid cell 42.

The elongated bars 52,54 of the measuring apparatus 50 can be adjusted to simulate fuel rods of various diameters. Toward this end, means in the form of a set screw 86 is attached to the lower end portion 62 or 66 of the one of the elongated bars 52,54 and can be adjusted to preset the displacement between the lower end portions of the bars. Specifically, by rotating the set screw 86, which in the illustrated embodiment is threadably attached to the lower end portion 66 of the rear bar 54, and by simultaneously adjusting the shaft 82 on the upper end portion 60 of the front bar 52, the set screw 86 is operable to coact with the lower end portion 62 of the front bar 52 to preset a minimum displacement between the bars at the respective lower end portions thereof and thereby a minimum combined cross-sectional dimension of the bars at their lower end portions. Then, when the lower end portions of the bars are inserted into a given one grid cell 42, such as seen in FIG. 7, they will simulate a fuel rod 18 disposed through the cell having a predetermined outside diameter.

Other features of the measuring apparatus 50 comprise an adjustable stop 88, guide means 90 and limit means 92. The adjustable stop 88 includes a strip 94 having an elongated slot 96 and being attached to one of the bars, such as the mid-section 58 of the rear bar 54 along the rearwardly facing side thereof, by a bolt 98 inserted through the slot. The strip 94 extends downwardly a short distance and has a lower terminal end 100 for engaging the top of a grid strap 40, as seen in FIG. 7, to provide correct positioning of the lower end portions 62,66 of the bars 52,54 in the one grid cell 42 for applying the increasing force to one of the springs 44 in the cell. The position of the terminal end 100 of the strip 94 can be vertically adjusted by untightening the bolt 98 and then sliding the strip 94 relative thereto.

The guide means 90, being coupled between the upper end portions 60,64 of the front and rear bars 52,54 to assist in maintaining alignment of the bars with one another as they are pivotally moved relative to one another, includes a guide pin 102 and a guide bore 100. The guide pin 102 is anchored in the upper end portion 60 or 64 of one of the elongated bars 52,54, such as the rear bar 54, and extends transversely toward the upper end portion of the other elongated bar, such as the front bar 52. The guide bore 104 is formed through the upper end portion of the other of the elongated bars, such as the front bar 52 for slidably receiving the guide pin 96 therethrough as the bars 52,54 are pivotally moved relative to one another.

The limit means 92, being a set screw threadably received through the upper end portion of one of the elongated bars, such as the front bar 52, extends transversely toward the upper end portion of the other of the elongated bars, such as the rear bar 54 for engagement therewith upon relative pivotal movement of the bars toward one another. The set screw 92 is adjustable for presetting the minimum displacement between the upper end portions 60,64 of the elongated bars 52,54 and thereby defining a maximum force which can be applied at their lower end portions 62,66 to the resilient spring 44 in the grid cell 42.

Finally, the grid force measuring apparatus 50 includes means for sensing and recording the spring force of the grid cell 42. First, means in the form of a strain gauge 106 is attached to the lower end portion of one of the elongated bars, such as the front bar 52, a short distance below its mid-section 56. The strain gauge 106 senses the level of the increasing force being applied to the spring 44 within the one grid cell 42 into which the bars 52,54 are inserted. Although the bars 52,54 are made of metal, the lower end portion 62 of the front bar 52 is thin enough in cross-section so as to have sufficient flexure to give a meaningful strain gauge readout.

Also, the measuring apparatus 50 has means, generally designated 108, in the form of a pair of electrical contacts being coupled between the lower end portions 62,66 of the front and rear bars 52,53 and capable of breaking contact with one another when application of the increasing force to the spring 44 in the cell 42 causes deflection of the spring to occur. The pair of electrical contacts 108 includes a circuit element in the form of an electrically conducting plate 110 attached to and electrically insulated from the lower end portion of one of the elongated bars, such as the front bar 52, and the set screw 86 attached to the lower end portions of the other of the elongated bars, such as the rear bar 54. As mentioned earlier, one function of the set screw 86 is to preset the displacement between the lower end portions 62, 66 of the elongated bars 52,54. The second function is to provide electrical contact with the circuit element 110 when the elongated bars 52,54 are initially inserted into the grid cell 42.

Lastly, as seen in FIG. 7, the measuring apparatus 50 has means in the form of a readout 112, preferably a suitable digital type, coupled across the terminals 114,116 of the strain gauge 106, being preferably in a bridge arrangement, and in parallel with the contacts 108. The readout 112 indicates the level of force at the instance deflection of the spring 44 occurs. Specifically, a pair of lead lines 118,120 couples the readout in series with the strain gauge terminals 114,116. However, the contacts 108, i.e., the circuit element 110 and set screw 86, are also connected by lead lines 122,124 in series with the strain gauge terminals. When the contacts 108 are closed, the terminals 114,116 of the strain gauge 106 are effectively short circuited and no force level signal is conducted to the readout 112. However, when the force applied to the grid cell spring 44 is marginally greater than the spring force, the spring 44 deflects and the electrical contacts 108 go from a closed to an open condition. Then the strain gauge terminals 114,116 are no longer shorted and a signal is generated by the strain gauge 106 and received and recorded by the readout 112 at the instance the contacts 108 are opened. This provides a determination of the spring force for the preselected fuel rod 18 outside diameter.

In FIG. 7, the pivotally connected elongated bars 52,54 of the measuring aparatus 50 are shown placed vertically in the grid cell 42 to be measured, with the rear bar 54 in contact with both grid dimples 46 and the front bar 52 in contact with the grid spring 44, With the bars preset by the set screw 86 at the selected fuel outside diameter dimension and rotatable shaft 82 in a loosened condition, the depth of insertion into the grid cell is preset by the adjustable positioning stop 88. By turning the knob 84, the shaft 82 is gradually tightened until electrical contact between the set screw 86 and the insulated conducting circuit element 110 is broken. The contact break is monitored electrically such that at the instance the break occurs the strain gauge 106 reading is recorded by readout 112. This reading determines the spring force for one spring 44 and its associated pair of dimples 46 at the preset dimension across the bars 52,54.

The same steps are repeated to measure the spring force for the other spring and pair of dimples in the same cell. The two readings are added together to get the total spring force in the given cell.

By increasing or decreasing the preset dimension between the bars 52,54 by, for example, increments of two thousands of one inch, the bars may be reinserted into the cell 42 and the spring force again determined. Using differences in spring force for the incremental changes in preset dimensions, the spring rate characteristic of the cell can be derived over the total required range.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. An apparatus for measuring the spring force imposed on a fuel rod when disposed through a cell in a support grid of a fuel assembly which contains at least one spring-like element, said apparatus comprising:
   (a) means for generating an increasing force at a first location external of said grid cell;
   (b) means for transmitting said increasing force from said first location and applying said increasing force at a second location displaced from said first location and internal of said grid cell to said at least one spring-like element disposed in said cell; and
   (c) means for measuring the level of said increasing force at the instance the application of said force causes deflection of said spring-like element to occur;
   (d) said transmitting and applying means including a pair of front and rear elongated members, each having a mid-section and upper and lower end portions extending in opposite directions from said mid-section, said members being connected together at their mid-sections for pivotal movement such that as said upper end portions of said members being juxtaposed in spaced apart relation to one another are moved toward and away from each other said lower end portions of said members also being juxtaposed in spaced apart relation to one another are moved away from and toward each other, said lower end portions of said members being adapted to fit into a grid cell while said upper end portions of said member extend upwardly therefrom.

2. The measuring apparatus as recited in claim 1, wherein said increasing force is applied to said spring-like element at said second location in a direction generally perpendicular to a central axis of said grid cell along which said fuel rod is inserted through said cell.

3. The measuring apparatus as recited in claim 1, wherein said elongated members include a pair of front and rear bars, said upper and lower end portions of said rear bar extending in opposite directions from said mid-section thereof and in generally linear alignment with one another, said upper and lower end portions of said front bar extending in opposite directions from said mid-section thereof and in a transversely offset relationship in which said upper end portion of said front bar is spaced remote from said upper end portion of said rear bar while said lower end portion of said front bar is spaced adjacent to said lower end portion of said rear bar.

4. The measuring apparatus as recited in claim 3, wherein said elongated members further include:
   a pair of transversely spaced tabs attached to said rear bar at its mid-section and extending outwardly from a side thereof facing said front bar, said tabs having respective aligned holes defined therethrough;
   means defining a hole through said mid-section of said front bar; and
   a pivot pin extending through said aligned holes in said spaced tabs on said rear bar and through said hole in said front bar and mounting said front bar on said tabs for pivotal movement relative to said rear bar.

5. The measuring apparatus as recited in claim 1, wherein said generating means includes a rotatable member coupling said upper end portions of said elongated members together and being operable to apply said increasing force at said first location so as to draw said upper end portions toward one another and thereby, via said pivotal connection of said members, push said lower end portions apart from one another when deflection of said spring-like element positioned within said grid cell in engagement with at least one of said lower end portions of said members occurs.

6. The measuring apparatus as recited in claim 5, wherein said rotatable member includes:
   a shaft rotatably connected to one of said upper end portions of said elongated members and threadably connected to the other thereof; and
   a knob attached to an end of said shaft for facilitating rotation of said shaft in either of two opposite directions in order to move said upper end portions of said elongated members toward and away from each other.

7. The measuring apparatus as recited in claim 1, further comprising:
   an adjustable stop attached to one of said members for engaging said grid so as to provide correct positioning of said lower end portions of said members in said grid cell for application of said increasing force to said spring-like element in said cell.

8. The measuring apparatus as recited in claim 1, further comprising:
   guide means coupled between said upper end portions of said elongated members to assist in maintaining alignment of said members with one another as they are pivotally moved relative to one another.

9. The measuring apparatus as recited in claim 8, wherein said guide means includes:
   a guide pin anchored in said upper end portion of one of said elongated members and extending transversely toward said upper end portion of the other of said members; and
   a guide bore formed through said upper end portion of the other of said members for slidably receiving said guide pin therethrough as said members are pivotally moved relative to one another.

10. The measuring apparatus as recited in claim 1, further comprising:
    limit means connected to said upper end portion of one of said elongated members and extending transversely toward said upper end portion of the other of said elongated members for engagement therewith upon relative pivotal movement of said elongated members toward one another, said limit means being adjustable for presetting the minimum displacement between said upper end portions of said elongated members and thereby defining a maximum force which can be applied at said lower end portions of said elongated members to said spring-like element in said grid cell.

11. The measuring apparatus as recited in claim 10, wherein said limit means is a set screw threadably received through said upper end portion of said one elongated member.

12. The measuring apparatus as recited in claim 1, wherein said transmitting and applying means further includes adjustable means disposed on said lower end portion of at least one of said elongated members and being operable to coact with said lower end portion of the other of said elongated members to preset a minimum displacement between said members at said respective lower end portions thereof and thereby a minimum combined cross-sectional dimension of said members at their lower end portions such that when said lower end portions of said members are inserted into a grid cell they simulate a fuel rod disposed through said cell having a predetermined outside diameter.

13. The measuring apparatus as recited in claim 1, wherein said measuring means includes:
 means coupled to at least one of said members for sensing the level of said increasing force being applied to said spring-like element within said grid cell;
 means coupled to at least one of said members for sensing when said deflection of said spring-like element occurs; and
 means coupled to said force level sensing means and said spring deflection sensing means for indicating the level of force at the instance said deflection of said spring-like element occurs.

14. The measuring apparatus as recited in claim 13, wherein said force level sensing means is a strain gauge attached to said lower end portion of one of said elongated members.

15. The measuring apparatus as recited in claim 13, wherein said spring deflection sensing means includes a pair of electrical contacts coupled between said lower end portions of said members and being capable of breaking contact with one another when said application of said increasing force to said spring-like element causes deflection of said spring-like element to occur.

16. The measuring apparatus as recited in claim 15, wherein said pair of electrical contacts includes:
 a circuit element attached to and electrically insulated from said lower end portion of one of said elongated members; and
 a set screw attached to said lower end portion of the other of said elongated members, said set screw being adjusted to preset the displacement between said lower end portions of said elongated members and being disposed in contact with said circuit element when said elongated members are initially inserted into said grid cell.

17. An apparatus for measuring the spring force imposed on a fuel rod when disposed through a cell in a support grid of a fuel assembly which contains at least one spring-like element, said apparatus comprising:
 (a) a pair of front and rear elongated members, each having a mid-section and upper and lower end portions extending in opposite directions from said mid-section, said members being pivotally connected together at their mid-sections such that as said upper end portions of said members being juxtaposed in spaced apart relation to one another are moved toward and away from each other said lower end portions of said members also being juxtaposed in spaced apart relation to one another are moved away from and toward each other;
 (b) means disposed on said lower end portion of at least one of said members and being operable to coact with said lower end portion of the other of said members to preset a minimum displacement between said members at said respective lower end portions thereof and thereby a minimum combined cross-sectional dimension of said members at their lower end portions such that when said lower end portions of said members are inserted into a grid cell they simulate a fuel rod disposed through said cell having a predetermined outside diamter;
 (c) means coupling said upper end portions of said members together and being operable to apply a progressively increasing force so as to draw said upper end portions toward one another and thereby, via said pivotal connection of said members, push said lower end portions apart from one another when deflection of said spring-like element positioned within said grid cell in engagement with at least one of said lower end portions of said members occurs;
 (d) means coupled to at least one of said members for sensing the level of the increasing force being applied to said spring-like element within said grid cell;
 (e) means coupled to at least one of said members for sensing when said deflection of said spring-like element occurs; and
 (f) means coupled to said force level sensing means and said spring deflection sensing means for indicating the level of force at the instance said deflection of said spring-like element occurs.

18. The measuring apparatus as recited in claim 17, further comprising:
 an adjustable stop attached to one of said members for engaging said grid so as to provide correct positioning of said lower end portions of said members in said grid cell for application of said increasing force to said spring-like element in said cell.

19. The measuring apparatus as recited in claim 17, further comprising:
 guide means coupled between said upper end portions of said elongated members to assist in maintaining alignment of said members with one another as they are pivotally moved relative to one another.

20. The measuring apparatus as recited in claim 17, further comprising:
 limit means connected to said upper end portion of one of said elongated members and extending transversely toward said upper end portion of the other of said elongated members for engagement therewith upon relative pivotal movement of said elongated members toward one another, said limit means being adjustable for presetting the minimum displacement between said upper end portions of said elongated members and thereby defining a maximum force which can be applied at said lower end portions of said elongated members to said spring-like element in said grid cell.

* * * * *